US008458241B2

United States Patent
Cho et al.

(10) Patent No.: US 8,458,241 B2
(45) Date of Patent: Jun. 4, 2013

(54) MEMORY ADDRESS GENERATING METHOD AND TWIDDLE FACTOR GENERATOR USING THE SAME

(75) Inventors: Hui-Rae Cho, Daejeon (KR); Gweon-Do Jo, Seoul (KR); Jin-Up Kim, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 1383 days.

(21) Appl. No.: 12/096,774

(22) PCT Filed: Dec. 6, 2006

(86) PCT No.: PCT/KR2006/005217
§ 371 (c)(1),
(2), (4) Date: Jun. 9, 2008

(87) PCT Pub. No.: WO2007/066964
PCT Pub. Date: Jun. 14, 2007

(65) Prior Publication Data
US 2008/0307026 A1     Dec. 11, 2008

(30) Foreign Application Priority Data

Dec. 8, 2005   (KR) .................... 10-2005-0119889
Nov. 28, 2006  (KR) .................... 10-2006-0118116

(51) Int. Cl.
*G06F 17/14*    (2006.01)
*G06F 15/00*    (2006.01)

(52) U.S. Cl.
USPC ........................................ 708/404; 708/400

(58) Field of Classification Search
USPC ................................. 708/403–409
See application file for complete search history.

(56) References Cited

U.S. PATENT DOCUMENTS

| 4,393,457 | A | * | 7/1983 | New ............................ 708/404 |
| 4,899,301 | A | * | 2/1990 | Nishitani et al. ............. 708/404 |
| 4,970,674 | A | * | 11/1990 | White .......................... 708/404 |
| 5,365,469 | A | * | 11/1994 | Mercy .......................... 708/404 |

(Continued)

FOREIGN PATENT DOCUMENTS

| KR | 10-2004-0046478 | 6/2004 |
| KR | 10-2007-0061166 | 6/2007 |
| WO |      97/19412   | 5/1997 |

OTHER PUBLICATIONS

Kim et al., Korean Patent Application Publication No. 10-2004-0046478, machine translation.*

(Continued)

*Primary Examiner* — Chat Do
*Assistant Examiner* — Matthew Sandifer
(74) *Attorney, Agent, or Firm* — Kile Park Reed & Houtteman PLLC

(57) ABSTRACT

The present invention relates to a memory address generating method and a twiddle factor generator using the memory address generating method in a fast Fourier transform (FFT) system. In the memory address generating method for generating a memory address of a twiddle factor in a fast Fourier transform (FFT) system according to an embodiment of the present invention: a) a temporary address value of a second twiddle factor is induced and generated based on a first twiddle factor; b) a control signal for controlling the system is generated based on the generated temporary address value; and c) a memory address value of the second twiddle factor is generated from the temporary address value.

18 Claims, 7 Drawing Sheets

U.S. PATENT DOCUMENTS

| | | | | |
|---|---|---|---|---|
| 5,491,652 A | * | 2/1996 | Luo et al. | 708/404 |
| 5,570,059 A | * | 10/1996 | Vora et al. | 327/415 |
| 6,061,705 A | * | 5/2000 | Hellberg | 708/408 |
| 6,090,140 A | | 7/2000 | Gabbay | |
| 6,098,088 A | * | 8/2000 | He et al. | 708/406 |
| 6,477,554 B1 | * | 11/2002 | Aizenberg et al. | 708/404 |
| 6,917,955 B1 | * | 7/2005 | Botchev | 708/406 |
| 7,062,523 B1 | * | 6/2006 | Hoffman et al. | 708/404 |
| 7,120,659 B2 | * | 10/2006 | Pelton | 708/405 |
| 7,693,034 B2 | * | 4/2010 | Singh et al. | 370/208 |
| 7,870,176 B2 | * | 1/2011 | Solomon et al. | 708/400 |
| 2004/0193663 A1 | * | 9/2004 | Pelton | 708/200 |
| 2005/0015420 A1 | * | 1/2005 | Gibb et al. | 708/404 |
| 2005/0160127 A1 | * | 7/2005 | Swartzlander et al. | 708/404 |
| 2005/0182806 A1 | | 8/2005 | Krishnamoorihi et al. | |
| 2006/0184598 A1 | * | 8/2006 | Buchert et al. | 708/405 |
| 2007/0033244 A1 | * | 2/2007 | Cohen et al. | 708/404 |

OTHER PUBLICATIONS

Hasan et al., "FFT Coefficient Memory Address Reduction Technique for OFDM Applications," Proc. IEEE ICASSP, vol. 1, pp. 1085-1088, 2002.*

International Search Report for PCT/KR2006/005217 dated Feb. 13, 2007.

Written Opinion for PCT/KR2006/005217 dated Feb. 13, 2007.

M. Hasan et al., "Scheme for reducing size in coefficient memory in FFT processor", Electronics Letters Feb. 14, 2008, vol. 38, No. 4, pp. 163-164.

Huirae Cho, et al., "R22SDF FFT Implementation with Coefficient Memory Reduction Scheme" IEEE 2006.

* cited by examiner

Conventional Radix-4 FFT Butterfly Operation

Where, n=0,1,2,⋯,N/4-1

Conventional Radix-4 Single-Path Delay Feedback (R4SDF) FFT Processor (N = 256)

Twiddle Factor Sequences of a Conventional Radix-4 FFT Algorithm (N = 256)

0 twiddle factor case (64): $W_{256}^0, W_{256}^0, W_{256}^0, W_{256}^0, \ldots, W_{256}^0, W_{256}^0$ 1 twiddle factor case (64): $W_{256}^0, W_{256}^1, W_{256}^2, W_{256}^3, W_{256}^4, \ldots, W_{256}^{62}, W_{256}^{63}$ 2 twiddle factor case (64): $W_{256}^0, W_{256}^2, W_{256}^4, W_{256}^6, W_{256}^8, \ldots, W_{256}^{124}, W_{256}^{126}$ 3 twiddle factor case (64): $W_{256}^0, W_{256}^3, W_{256}^6, W_{256}^9, W_{256}^{12}, \ldots, W_{256}^{186}, W_{256}^{189}$

MEMORY ADDRESS GENERATING METHOD AND TWIDDLE FACTOR GENERATOR USING THE SAME

TECHNICAL FIELD

The present invention relates to a fast Fourier transform (FFT) system, and more particularly, to a memory address generating method for reducing a memory area and a twiddle factor generator using the memory address generating method.

BACKGROUND ART

An orthogonal frequency division multiplexing (OFDM) method is used in wireless communication systems including an IEEE 802.11 wireless local area network (WLAN) and an IEEE 802.16 wireless metropolitan area network (MAN), and in digital broadcasting systems including a digital multimedia broadcasting (DMB) system. In this case, a fast Fourier transform (FFT) processor is one of the most important constituent elements in the OFDM system.

An FFT algorithm is used to operate a discrete Fourier transform operation at a high speed, and the discrete Fourier transform (DFT) operation is given as Equation 1.

$$X(k) = \sum_{n=0}^{N-1} x(n) \cdot W_N^{nk}, k = 0, 1, 2, \ldots, N-1 \quad \text{[Equation 1]}$$

where, $$W_N = e^{-j\frac{2\pi}{N}}, N = 2^r$$

Here, $X(_K)$ denotes a result of the Fourier transform, x(n) denotes a FFT input data row, and $W_N$ denotes a twiddle factor, which are formed as complex numbers. In this case, the twiddle factor is a periodic function used to convert a time domain signal to a frequency domain signal. The FFT algorithm is performed to realize Equation 1.

Various methods for realizing the FFT algorithm have been suggested, which include a Radix-2 method and a Radix-4 method. Here, a configuration and a controlling operation of the Radix-4 method is more complicated compared to that of the Radix-2, but the Raix-4 method is more widely used since it has better multiplication performance. In the Radix-4 FFT algorithm, complex multiplication of the twiddle factor is performed, and twiddle factor values are stored in a memory.

An algorithm by M. Hasan and T. Arslan has been suggested to reduce the memory area of the twiddle factors in the FFT processor. In the algorithm, since all twiddle factors are formed in blocks by using a symmetry characteristic of the twiddle factor in the Radix-2 FFT processor, $$\frac{N}{2}$$

twiddle factors are reduced to $$\frac{N}{8} + 1$$

twiddle factors.

However, the above algorithm is used in the Radix-2 method. In addition, it is required to respectively apply different memory address calculations and output equations for the respective divided blocks. That is, a memory address calculation and a realizing configuration that are commonly applied to the respective blocks are not suggested.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a device for reducing a memory area required to store twiddle factors when a Radix-4 fast Fourier transform (FFT) system is realized, and a method thereof.

An exemplary twiddle factor generator for generating a twiddle factor in a fast Fourier transform (FFT) system includes a memory address calculator, a twiddle factor storage unit, and a controller. The memory address calculator generates a temporary address value for calculating a twiddle factor address value, generates a twiddle factor memory address value based on the temporary address value, and outputs a control signal based on the generated temporary address value for the twiddle factor. The twiddle factor storage unit stores a twiddle factor value corresponding to the twiddle factor memory address value, the twiddle factor value is generated based on a previously generated twiddle factor, and the twiddle factor storage unit outputs the twiddle factor value as a real part and an imaginary part. The controller outputs the twiddle factor value to the FFT system based on the control signal output from the memory address calculator.

In an exemplary method for generating a memory address of a twiddle factor in a fast Fourier transform (FFT) system according to an embodiment of the present invention: a temporary address value of the twiddle factor is obtained; a control signal for controlling the FFT system is generated based on the generated temporary address value of the twiddle factor; and a twiddle factor memory address value is output after generating the twiddle factor memory address value based on the generated temporary address value and the control signal.

BEST MODE

Figure 1:
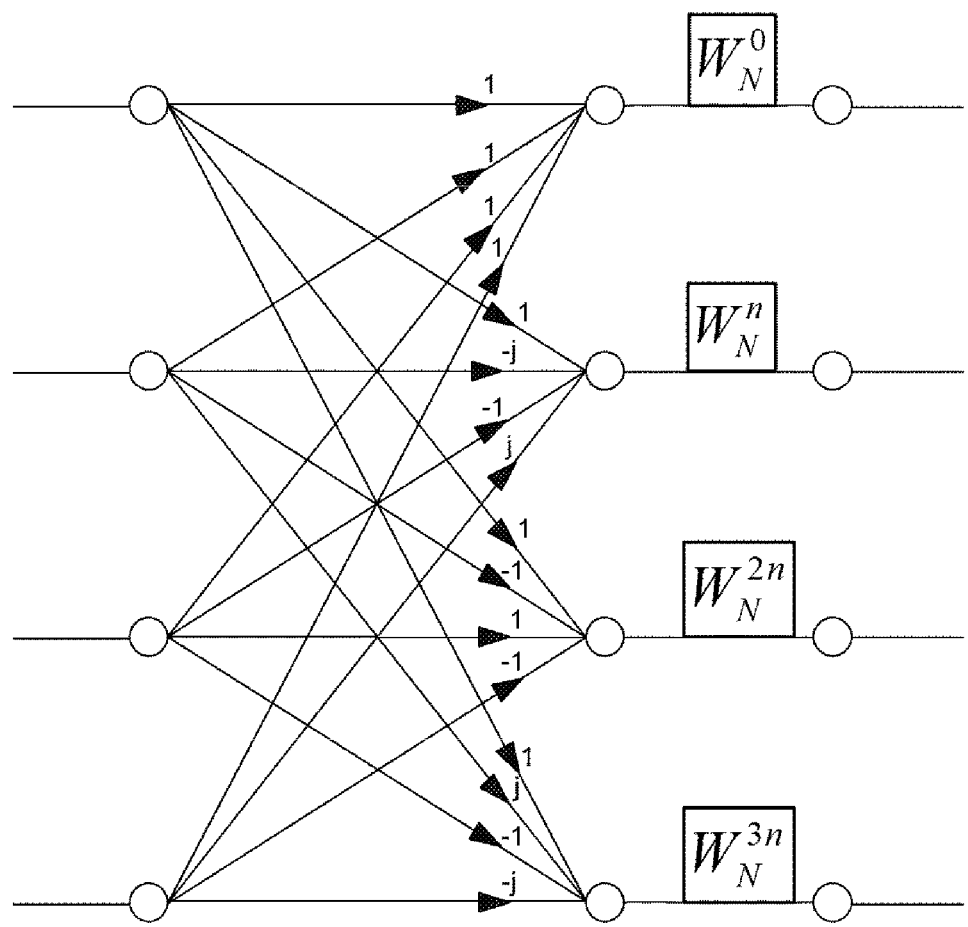
FIG. 1 shows a diagram representing a signal flow of a conventional Radix-4 fast Fourier transform butterfly operation.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise", and variations such as "comprises" or "comprising", will be understood to imply the inclusion of stated elements but not the exclusion of any other elements.

A signal flow of a conventional Radix-4 fast Fourier transform (FFT) butterfly operation will be described with reference to FIG. 1. A configuration and a controlling operation of the Radix-4 method are more complicated compared to those of the Radix-2, but the Raix-4 method is more widely used since it has better multiplication performance. Characteristics of a Radix-4 FFT algorithm are shown as following Equations. Firstly, a discrete Fourier transform (DFT) equation given as Equation 1 is divided into four groups, which is given as Equation 2.

$$X(k) = \sum_{n=0}^{N/4-1} x(n)W_N^{kn} + \sum_{n=N/4}^{N/2-1} x(n)W_N^{kn} +$$
$$\sum_{n=N/2}^{3N/4-1} x(n)W_N^{kn} + \sum_{n=3N/4}^{N-1} x(n)W_N^{kn}$$
$$= \sum_{n=0}^{N/4-1} \left[x(n) + x\left(n+\frac{N}{4}\right)W_N^{\frac{Nk}{4}} + x\left(n+\frac{N}{2}\right)W_N^{\frac{Nk}{2}} + x\left(n+\frac{3N}{4}\right)W_N^{\frac{3Nk}{4}}\right]W_N^{nk}$$
$$= \sum_{n=0}^{N/4-1} \left[x(n) + (-j)^k x\left(n+\frac{N}{4}\right) + (-1)^k x\left(n+\frac{N}{2}\right) + (j)^k x\left(n+\frac{3N}{4}\right)\right]W_N^{nk}$$

[Equation 2]

Equation 3 is obtained by dividing output results X(k) of a Fourier transform operation of Equation 2 into four subgroups.

$$X(4k) = \sum_{n=0}^{N/4-1} \left[\begin{array}{c} x(n) + x\left(n+\frac{N}{4}\right) + \\ x\left(n+\frac{N}{2}\right) + x\left(n+\frac{3N}{4}\right) \end{array}\right] W_N^0 W_{N/4}^{kn}$$

$$X(4k+1) = \sum_{n=0}^{N/4-1} \left[\begin{array}{c} x(n) - jx\left(n+\frac{N}{4}\right) - \\ x\left(n+\frac{N}{2}\right) + jx\left(n+\frac{3N}{4}\right) \end{array}\right] W_N^n W_{N/4}^{kn}$$

[Equation 3]

$$X(4k+2) = \sum_{n=0}^{N/4-1} \left[\begin{array}{c} x(n) - x\left(n+\frac{N}{4}\right) + \\ x\left(n+\frac{N}{2}\right) - x\left(n+\frac{3N}{4}\right) \end{array}\right] W_N^{2n} W_{N/4}^{kn}$$

$$X(4k+3) = \sum_{n=0}^{N/4-1} \left[\begin{array}{c} x(n) + jx\left(n+\frac{N}{4}\right) - \\ x\left(n+\frac{N}{2}\right) - jx\left(n+\frac{3N}{4}\right) \end{array}\right] W_N^{3n} W_{N/4}^{kn}$$

A butterfly basic signal flow of the Radix-4 FFT algorithm is shown as FIG. 1 based on Equation 3. FIG. 1 shows a diagram representing a signal flow of a conventional Radix-4 FFT butterfly operation.

As shown in FIG. 1, after performing a butterfly operation of each end, a complex twiddle factor $W_N$ is multiplied. In this case, in the Radix-4 FFT algorithm, four groups formed, and $W_N^0$, $W_N^n$, $W_N^{2n}$, $W_N^{3n}$ are respectively multiplied N/4 times. That is, when realizing the conventional Radix-4 FFT, the twiddle factors previously stored in the memory are used, a memory address storing the twiddle factor at a time when the twiddle factor is multiplied is read, and complex multiplication is performed with input data.

To realize the Radix-4 FFT, FFT realizing methods are provided, such as a Radix-4 single-path delay feedback (R4SDF), a Radix-4 multi-path delay commutator (R4MDC), and a Radix-4 single-path delay commutator (R4SDC). In the various methods, the twiddle factor multiplication is performed in the same manner, and the twiddle factor is generally stored in the memory.

In an exemplary embodiment of the present invention, a device for reducing a memory area by using the R4SDF method and a method thereof are suggested. Firstly, a configuration of a R4SDF FFT processor will be described with reference to FIG. 2.

Figure 2:
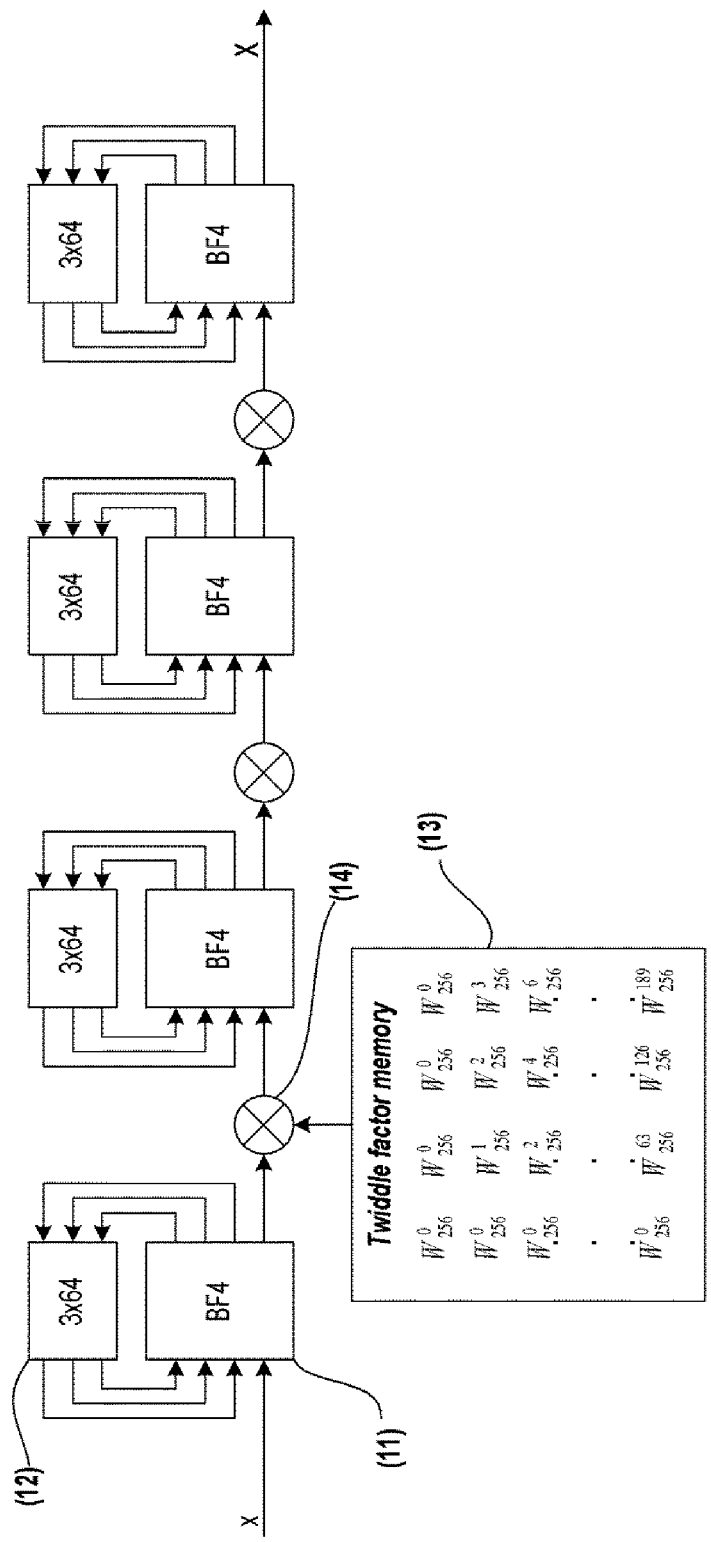
FIG. 2 shows a diagram representing a configuration of a conventional Radix-4-square single-path delay feedback (R4SDF) FFT processor (N=256).

FIG. 2 shows a diagram of a configuration of a conventional R4SDF FFT processor (N=256).

As shown in FIG. 2, a butterfly unit 11 of the R4SDF FFT processor uses input data and a feedback register to perform complex adding and complex subtracting operations. A calculation result of the butterfly unit 11 is multiplied with a twiddle factor value by a complex multiplier 14, and is transmitted to a subsequent butterfly unit. A twiddle factor storage memory 13 storing the twiddle factors stores complex twiddle values for respective four $W_N^0$, $W_N^n$, $W_N^{2n}$, $W_N^{3n}$ cases.

In a like manner of other FFT algorithms, in the Radix-4 FFT processor, the complex multiplication of the twiddle factor is performed, and the twiddle factor values are stored in the twiddle factor storage memory 13 to use. In this case, as a size N of the FFT operation is increased, the number of the twiddle factors is increased, and therefore it is require to increase the memory area. The increased memory area widely covers an integrated circuit (IC) area, and power consumption is increased. When the N-point FFT operation is performed in the conventional Radix-4 FFT processor, it is required to provide 3N/4 twiddle factor memories.

Figure 3:
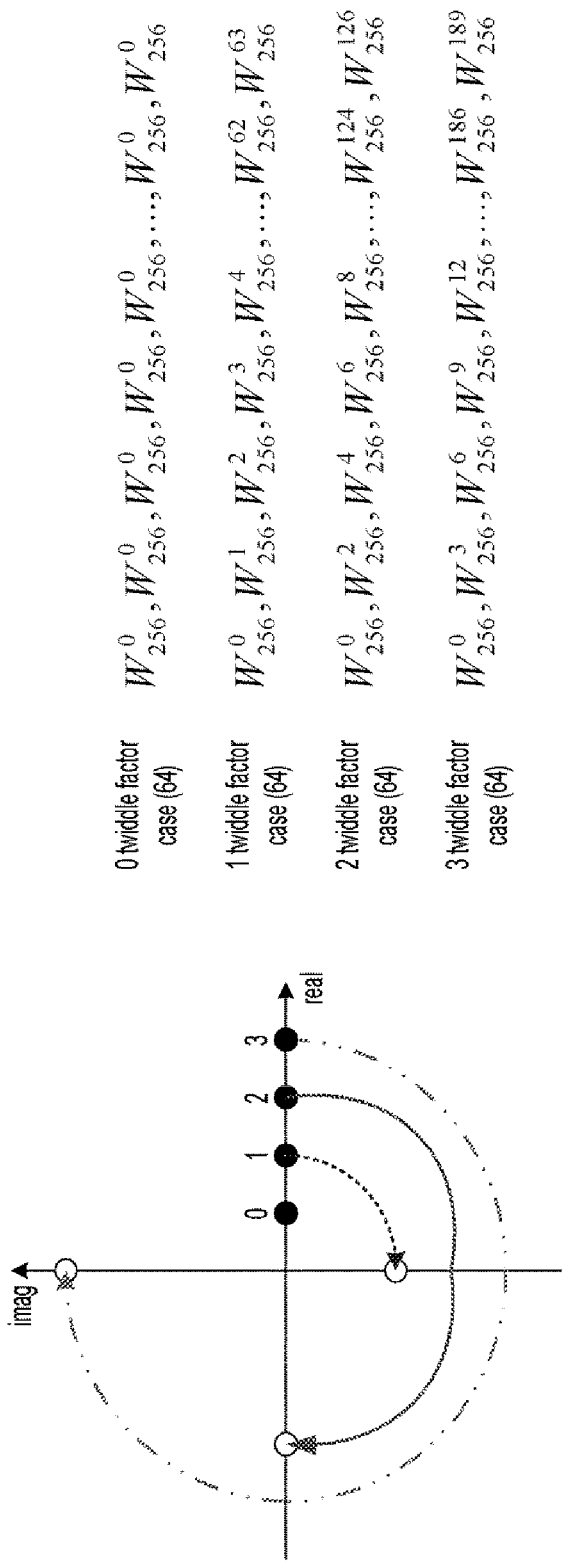
FIG. 3 shows a diagram representing twiddle factor sequences of the conventional Radix-4 FFT system (N=256).

FIG. 3 shows a diagram representing twiddle factor sequences of the conventional Radix-4 FFT algorithm (N=256).

The R4SDF is exemplified in the exemplary embodiment of the present invention, but it is not limited thereto, and the Radix-4 FFT algorithms may be applied.

Referring to FIG. 3, four twiddle factor cases of Radix-4 are sequentially multiplied during a period for performing the N-point FFT operation. An index increases by 0 in a 0 twiddle factor case, an index increases by 1 in a 1 twiddle factor case, an index increases by 2 in a 2 twiddle factor case, and an index increases by 3 in a 3 twiddle factor case. In Radix-4 FFT processor according to the exemplary embodiment of the present invention, the multiplication is sequentially performed in an order of the 0 twiddle factor case, the 1 twiddle factor case, the 2 twiddle factor case, and the 3 twiddle factor case.

When performing the N-point FFT operation (N=256), 256 twiddle factors are multiplied. The 64 twiddle factors from $W_{256}^{0}$ to $W_{256}^{189}$ in the 0 twiddle factor case, and the 64 twiddle factors from $W_{256}^{0}$ to $W_{256}^{63}$ in the 1 twiddle factor case are input to complex multiplier 14. The 64 twiddle factors from $W_{256}^{0}$ to $W_{256}^{126}$ in the 2 twiddle factor case, and the 64 twiddle factors from $W_{256}^{0}$ to $W_{256}^{189}$ in the 3 twiddle factor case are input to the complex multiplier 14. Here, when a different number is provided as N, the twiddle factor sequence is formed the same above, but a subfix of the twiddle factor is changed and the number of each twiddle factor case becomes N/4.

Twiddle factor values according to an exemplary embodiment of the present invention will be described with reference to FIG. 4.

Figure 4:
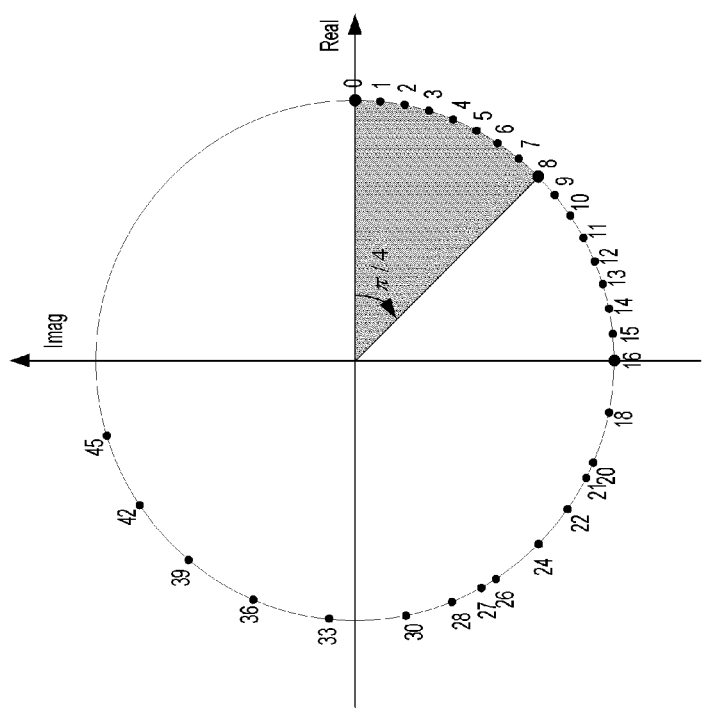
FIG. 4 shows a diagram representing a complex coordinate of twiddle factors of a Radix_4 FFT system according to an exemplary embodiment of the present invention (N=64).

FIG. 4 shows a diagram representing a complex coordinate of twiddle factors of a Radix-4 FFT system according to the exemplary embodiment of the present invention (N=64).

Numbers shown in FIG. 4 indicate twiddle factor indexes (N=64). For example, 15 denotes $W_{64}^{15}$. Referring to FIG. 4, the twiddle factors according to the exemplary embodiment of the present invention have symmetric characteristics.

For example, the twiddle factors 6 and 7 and the twiddle factors 9 and 10 are symmetrical based on the twiddle factor 8. That is, a real number value and an imaginary number value of the twiddle factor 7 are switched, and signs thereof are changed to obtain the twiddle factor 9.

In addition, the twiddle factor 18 and the twiddle factor 14 are symmetrical based on an imaginary axis. Since the twiddle factors 2 and 4 are symmetrical based on the twiddle factor 8, the twiddle factor 18 may be obtained from the twiddle factor 2.

By using the symmetry characteristic of the twiddle factor, the twiddle factors (N=64) may be induced from the twiddle factors 0 to 8. That is, the number of twiddle factor memories may be reduced to $$\frac{N}{8}+1$$

by storing the twiddle factors 0 to 8 in a memory, according to the exemplary embodiment of the present invention.

The twiddle factors (N=64) may be obtained from the twiddle factor memories (N=256). For example, $W_{64}^{15}=W_{256}^{60}$. That is, the twiddle factor 15 (N=64) is equal to the twiddle factor 60 (N=256). Accordingly, in the FFT configuration (N=256) shown in FIG. 2, the twiddle factors used in the butterfly unit may be obtained from $$33\left(=\frac{256}{8}+1\right)$$

twiddle factor memories stored in the twiddle factor storage memory 13 subsequent to the first butterfly unit.

TABLE 1

| Order | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 twiddle factor case | Original twiddle factor number | 0 | 0 | 0 | 0 | 0 | 0 | 0 | 0 | 0 | 0 | 0 | 0 | 0 | 0 | 0 | 0 |
| | Induced twiddle factor number | 0 | 0 | 0 | 0 | 0 | 0 | 0 | 0 | 0 | 0 | 0 | 0 | 0 | 0 | 0 | 0 |
| 1 twiddle factor case | Orininal twiddle factor number | 0 | 1 | 2 | 3 | 4 | 5 | 6 | 7 | 8 | 9 | 10 | 11 | 12 | 13 | 14 | 15 |
| | Induced twiddle factor number | 0 | 1 | 2 | 3 | 4 | 5 | 6 | 7 | 8 | 7 | 6 | 5 | 4 | 3 | 2 | 1 |
| 2 twiddle factor case | Original twiddle factor number | 0 | 2 | 4 | 6 | 8 | 10 | 12 | 14 | 16 | 18 | 20 | 22 | 24 | 26 | 28 | 30 |
| | Induced twiddle factor number | 0 | 2 | 4 | 6 | 8 | 6 | 4 | 2 | 0 | 2 | 4 | 6 | 8 | 6 | 4 | 2 |
| 3 twiddle factor case | Original twiddle factor number | 0 | 3 | 6 | 9 | 12 | 15 | 18 | 21 | 24 | 27 | 30 | 33 | 36 | 39 | 42 | 45 |
| | Induced twiddle factor number | 0 | 3 | 6 | 7 | 4 | 1 | 2 | 5 | 8 | 5 | 2 | 1 | 4 | 7 | 6 | 3 |

Table 1 shows twiddle factors 0 to 8 induced by using the symmetrical characteristics of the twiddle factors (N=64) shown in FIG. 4. Equation 4 is used to induce the twiddle factors (i.e., a memory address of the twiddle factor) shown in Table 1.

$$A_{n\_tmp}=A_{n-1}+S\cdot N_Q \quad \text{[Equation 4]}$$

Here, $A_{n\_tmp}$ denotes a temporary calculation value of an address of the twiddle factor, and a memory address $A_n$ of the induced twiddle factor is determined according to three cases shown in Equation 5. S denotes a sign value alternately having −1 and 1, and an initial value thereof is set to 1.

$N_Q$ denotes a parameter indicating the respective twiddle factor cases, and it has values of 0, 1, 2, and 3 when a corresponding operation is performed. That is, to obtain an $n^{th}$ temporary address value $A_{n\_tmp}$, the sign value of the twiddle factor and the parameter of the twiddle factor case are multiplied, and an address value of an $(n-1)^{th}$ twiddle factor that is a previous twiddle factor address value is added.

① When $D>A_{n\_tmp}>0, A_n=A_{n\_tmp}$.

② When $A_{n\_tmp} \geq D, A_n=2D-A_{n\_tmp}$ and $S=-1$

③ When $A_{n\_tmp} \leq 0, A_n=-A_{n\_tmp}$ and $S=1$     [Equation 5]

Here, D denotes a minimum symmetric point of the twiddle factor. When the N-point FFT is performed, D=N/8. That is, when N=64, D=8 in FIG. 8. The twiddle factors shown in Table 1 are sequentially obtained by Equation 4 and Equation 5.

That is, a temporary address value of an $n^{th}$ twiddle factor obtained by Equation 4 and the minimum symmetric point of a $(n-1)^{th}$ twiddle factor are compared. When the temporary address value is equal to or greater than the minimum symmetric point, the memory address value of the $n^{th}$ twiddle factor is set by doubling the minimum symmetric point of the twiddle factor and subtracting the temporary address value of the $n^{th}$ twiddle factor. In addition, when the temporary address value of the $n^{th}$ twiddle factor is lower than 0, the memory address value of the $n^{th}$ twiddle factor is set by reversing the sign of the temporary address value of the $n^{th}$ twiddle factor.

A device for generating the twiddle factor will be described with reference to FIG. 5.

Figure 5:
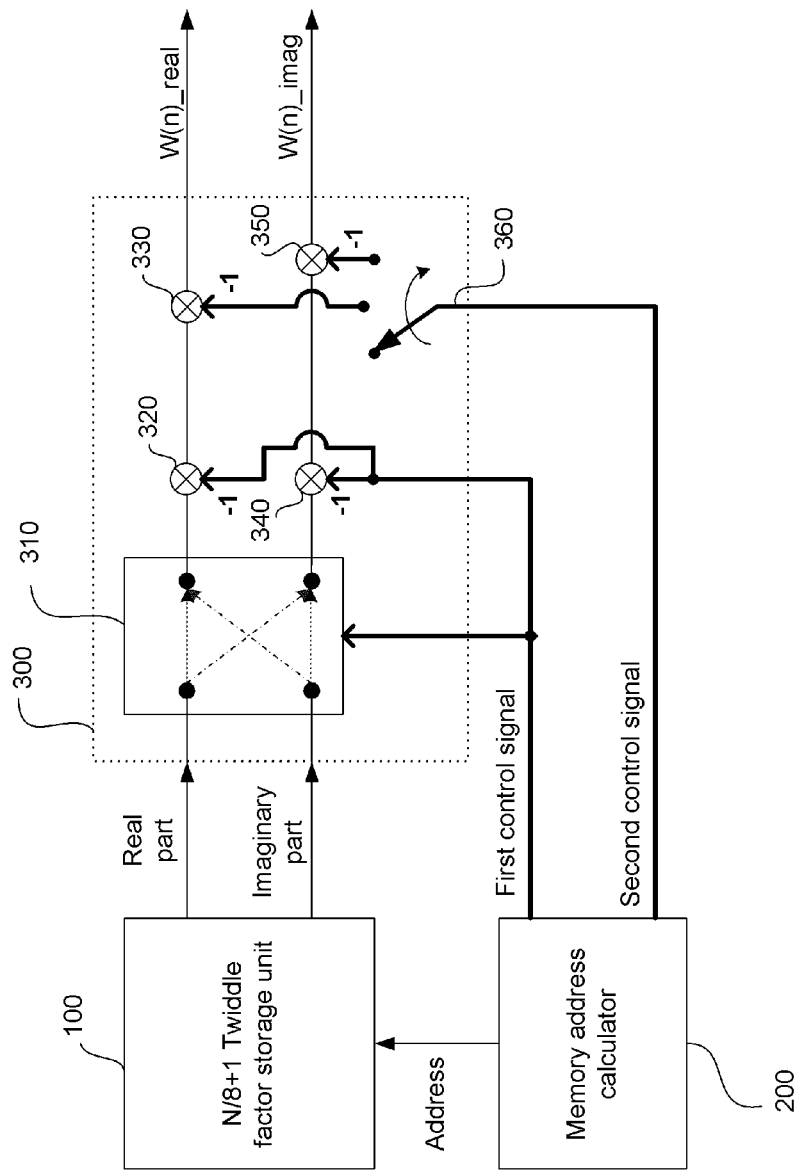
FIG. 5 shows a diagram of a configuration of a twiddle factor generator for generating the twiddle factor of the Radix_4 FFT algorithm according to the exemplary embodiment of the present invention.

FIG. 5 shows a diagram of a configuration of a twiddle factor generator for generating the twiddle factor of the Radix-4 FFT algorithm according to the exemplary embodiment of the present invention.

As shown in FIG. 5, the twiddle factor generator for generating the twiddle factor includes a twiddle factor storage unit 100, a memory address calculator 200, and a controller 300.

The twiddle factor storage unit 100 stores the twiddle factors required to perform the N-point FFT algorithm, and separates the twiddle factor into a real $$\frac{N}{8} + 1$$

part and an imaginary part. In this case, storage spaces are required as described with reference to FIG. 4. For example, when the N-point FFT algorithm is performed (N=256), the number of twiddle factors is 33, and the number of storage spaces is 33.

The memory address calculator 200 operates Equation 4 and Equation 5. That is, the memory address calculator 200 generates a memory address of the twiddle factor stored in the twiddle factor storage unit 100.

As described in FIG. 4, the twiddle factor to be actually output is obtained by switching the real part and the imaginary part of a value induced from the twiddle factor storage unit 100, or switching signs thereof, which may be easily performed by two control signals according to the value $A_{n\_tmp}$ of the memory address calculator 200.

The controller 300 includes switches 310 and 360, and sign inverters 320, 330, 340, and 350. The switch 310 (also, referred to as a "first switch") switches the real and imaginary parts of the twiddle factor output by the twiddle factor storage unit 100 when $A_{n\_tmp} \leq D$, $A_n = 2D - A_{n\_tmp}$, and $S = -1$ in the case ② shown in Equation 5. In the case ①, the real part and the imaginary part are not switched.

The switch 360 (also, referred to a "second switch") operates the sign inverters 330 and 350. That is, when $A_{n\_tmp} \leq 0$ in the case ③ shown in Equation 5, the sign inverters 330 and 350 are driven. That is, the second switch 360 is maintained in an initial state at a start point of each case, and sequentially operates the sign inverters 330 and 350 when the case ③ shown in Equation 5 occurs.

The sign inverters 320, 330, 340, and 350 receive operation signals from the memory address calculator 200, and invert signs of signals from the switch 310 to output final twiddle factors as shown in FIG. 5. Here, control signals are required to operate the sign inverters 320, 330, 340, and 350, and there are two types of control signals output from the memory address calculator 200. The control signal may be generated according to the temporary value $A_{n\_tmp}$ of the twiddle factor calculated by the memory address calculator 200.

For example, the sign inverters 320 and 340 alternately output signals having the sign of the original signal, the inverted sign, and the sign of the original signal when the control signal corresponding to the case ② shown in Equation 2 is generated. Hereinafter, the control signal that is output from an upper terminal of the memory address calculator 200 shown in FIG. 5 will be referred to as a "first control signal". That is, the first switch 310 switches the real part and the imaginary part output from the twiddle factor storage unit 100 according to the first control signal, and sign inverters 320 and 340 invert the sign thereof. In this case, a negative sign is multiplied when the first control signal is initially generated, and a positive sign is multiplied when a subsequent first control signal is generated.

The control signal (hereinafter, referred to as a "second control signal") output from a lower terminal of the memory address calculator 200 shown in FIG. 5 is activated in the case ③ shown in Equation 5. The activated second control signal operates the second switch 360 and the sign inverters 330 and 350 to invert the sign of the signal output from the switch 310. Here, the sign inverters 330 and 350 invert the sign of the signal input thereto.

The second switch 360 operates when the second control signal is generated. The second control signal may be generated twice to the maximum during one twiddle factor case. When the second control signal is initially generated, the second switch 360 is connected to the sign inverter 330 to invert the sign of the output signal. When the second control signal is subsequently generated, the switch 360 is connected to the sign inverter 350 to invert the sign of the signal output as the imaginary part. When one twiddle factor case is finished, the state of the sign inverters 330 and 350 is turned back to an original state thereof, and the sign inverters 330 and 350 output an input signal without switching the sign.

The sign inverters 320, 330, 340, and 350, the switches 310 and 360, and the first and second control signals are initialized when the respective twiddle factor cases are started.

In the cases ② and ③ shown in Equation 5, W(n)_real and W(n)_imag are output as values of which signs are inverted or the real and imaginary parts are switched. In the case ① shown in Equation 5, the control operations of the switch 360 and the sign inverters 320, 330, 340, and 350 are not performed.

That is, when the case ② shown in Equation 5 is initially generated and the switch 310 operates, the real and imaginary parts may be switched and the signs may be inverted. When the subsequent temporary twiddle factor calculation value corresponds to the case ②, the switch 310 and the sign inverters 320, 330, 340, and 350 are maintained to output the value of which the real part and the imaginary part are switched and the signs are inverted. The output values are input to complex multiplier 14 shown in FIG. 1, and remaining FFT operations are performed.

A method for finally generating the twiddle factor by the twiddle factor generator described in FIG. 5 will be described with reference to FIG. 6.

Figure 6:
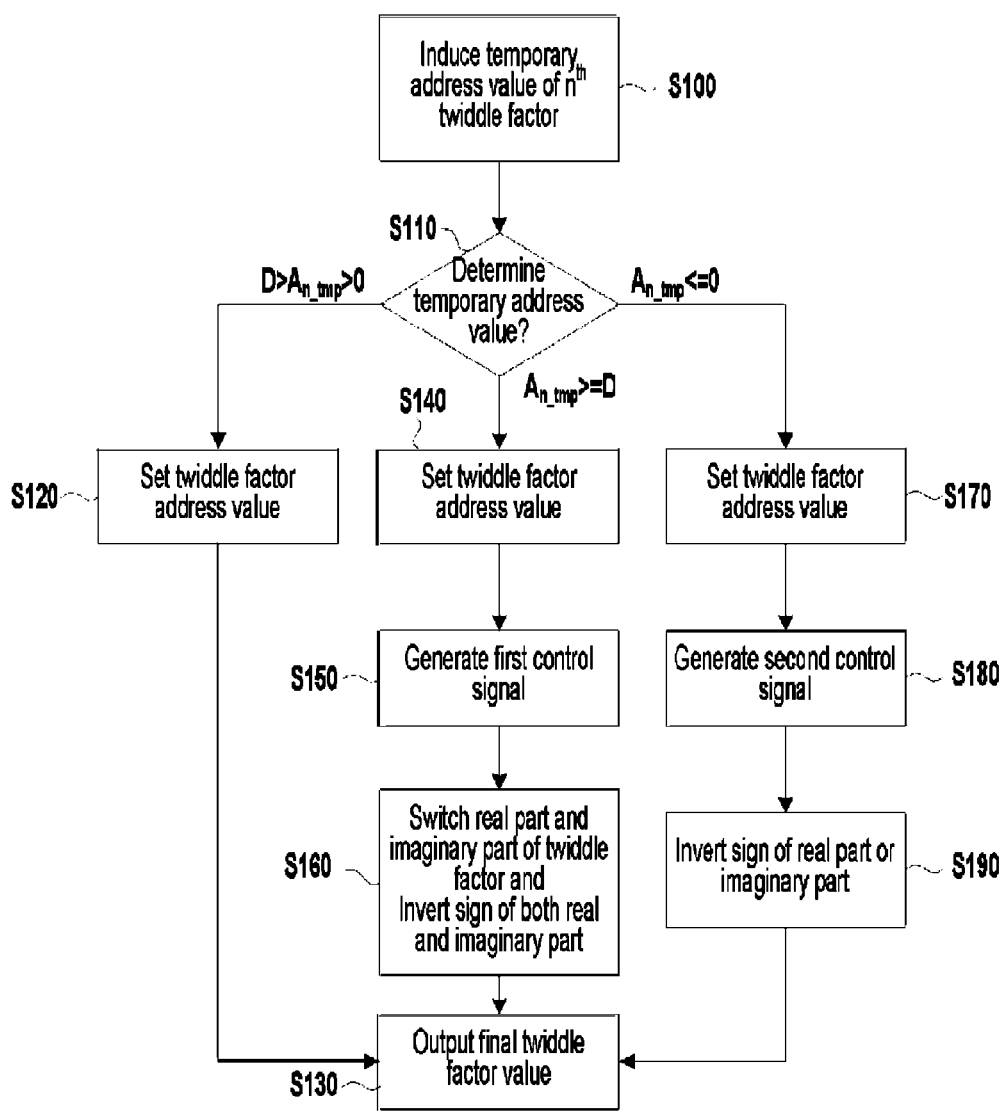
FIG. 6 shows a flowchart representing a method for generating a twiddle factor according to the exemplary embodiment of the present invention.

FIG. 6 shows a flowchart representing a method for generating a twiddle factor according to the exemplary embodiment of the present invention.

As shown in FIG. 6, a temporary address value of an $n^{th}$ twiddle factor is induced by using Equation 4 in step S100. The temporary value of the twiddle factor is induced by multiplying a sign value of the twiddle factor and a parameter value indicating the twiddle factor case, and adding an address value of an $(n-1)^{th}$ twiddle factor.

When the temporary address value of the $n^{th}$ twiddle factor is induced in step S100, the corresponding temporary address value is determined in step S10 based on the three cases shown in Equation 5.

When the temporary address value is given as $D > A_{n\_tmp} > 0$ (i.e., the case ① shown in Equation 5), the temporary address value is set as an $n^{th}$ twiddle factor value, and the address value is transmitted to the twiddle factor storage unit 100 storing the N/8+1 complex twiddle factor values in step S120. When the twiddle factor value is output as the real part and the imaginary part based on the transmitted twiddle factor address value, the output twiddle factor is transmitted as the final twiddle factor value without changing the real and imaginary parts and the signs in step S130. That is, the real and imaginary parts and the signs of a previous stage are output.

When the temporary address value is given as $A_{n\_tmp} \geq D$ in step S110 (i.e., the case ② shown in Equation 5), the memory address calculator 200 establishes a memory address value of the $n^{th}$ twiddle factor by doubling the minimum symmetric point of the twiddle factor and subtracting the temporary address value in step S140. Subsequently, the memory address calculator 200 generates the first control signal in step S150.

The generated first control signal operates the first switch 310 and the sign inverters 320 and 340 to switch the real part and the imaginary part of the $n^{th}$ twiddle factor output from the twiddle factor storage unit 100 in step S160. The twiddle factor, in which the real part and the imaginary part are switched, is output as the final twiddle factor value in step S130.

When the temporary address value is given as $A_{n\_tmp} \leq 0$ (i.e., the case ③ shown in Equation 5) in step S110, the memory address calculator 200 inverts the sign of the temporary address value, establishes the temporary address value having the inverted sign as an $n^{th}$ twiddle factor address value, and transmits the $n^{th}$ twiddle factor address value to the twiddle factor storage unit 100 in step S170. Subsequently, the memory address calculator 200 generates the second control signal in step S180.

The generated second control signal operates the sign inverters 330 and 350 to invert the signs of the real and imaginary parts of the $n^{th}$ twiddle factor output from the twiddle factor storage unit 100, in step S190. The twiddle factor, of which the sign of the real part or the imaginary part is inverted, is output as the final twiddle factor value in step S130.

Variations of the control signal, which is described in FIG. 5, according to a time variation will be described with reference to FIG. 7.

Figure 7:
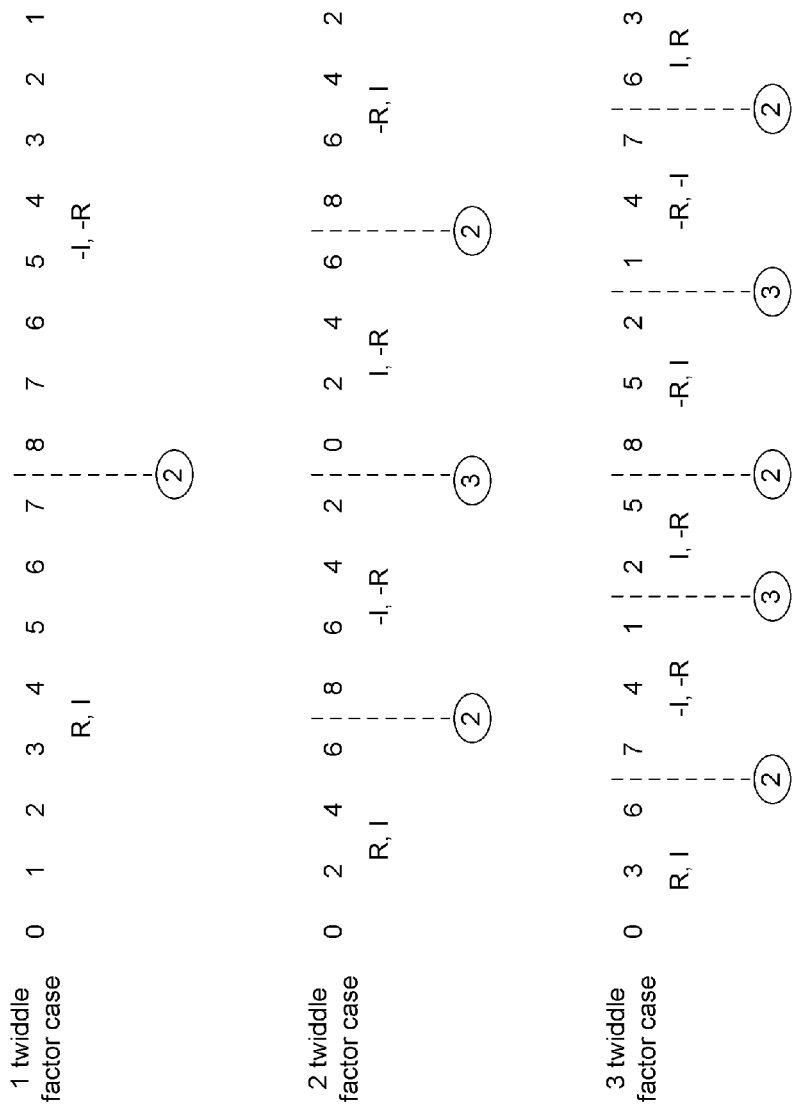
FIG. 7 shows a diagram representing variations of a control signal of the twiddle factor generator according to a time variation.

FIG. 7 shows a diagram representing variations of the control signal of the twiddle factor generator according to a time variation.

Since all twiddle factor values are $W_N^0$ in the 0 twiddle factor case as shown in Table 1, descriptions thereof will be omitted. Referring to FIG. 7, in the 1, 2, and 3 twiddle factor cases, the real and imaginary parts are switched and signs of the real and imaginary parts are inverted in the case ②, and the signs of the real part and the imaginary part are sequentially inverted once in the case ③.

As shown in FIG. 7, the 9 twiddle factor values are set (i.e., 0 to 8) according to the minimum symmetric point of the twiddle factor when N=64 in the exemplary embodiment of the present invention, but they are not limited thereto, In addition, a dotted line shows that the ② or ③ case is generated according to the calculation of Equation 4 and Equation 5 and shows a time for generating the first control signal or the second control signal according to the ② or ③ case. Accordingly, after the dotted line, a type of an output signal is changed.

Referring to FIG. 7, in the 1 twiddle factor case (i.e., the index of the twiddle factor is 1), the first control signal is generated when a ninth twiddle factor is calculated. In the 3 twiddle factor case (i.e., the index of the twiddle factor is 3), the first control signal and the second control signal are alternately applied in a line manner of the 1 and 2 twiddle factor cases.

In the 2 twiddle factor case (i.e., the index of the twiddle factor is 2), four twiddle factor values are calculated, the first control signal is generated, and a fifth twiddle factor value is calculated. After the first signal is generated and the four twiddle factor values are calculated, the second control signal is generated, and the ninth twiddle factor value is calculated.

In further detail, when the fourth twiddle factor value is 6, $A_{n-1}$ is 4 (refer to the 2 twiddle factor case shown in Table 1), S is 1, and $N_Q$ is 2. $A_{n\_tmp}$, which is a temporary address value of the fourth twiddle factor, is 6 (i.e., 4+1·2). In this case, since a result value 6 corresponds to the ① shown in Equation 5, the temporary address value 6 is set as a memory address value of the fourth twiddle factor.

When a fifth twiddle factor value is 8, $A_{n-1}$ is 6, S is 1, $N_Q$ is 2. $A_{n\_tmp}$, which is the temporary address value of the fifth twiddle factor, is 8 (i.e., 6+1·2). In this case, since the result value 8 corresponds to the ② case shown in Equation 5, the memory address calculator 200 generates the first control signal. The generated first control signal operates the first switch 310 to switch the real and imaginary parts and to invert the signs. In the twiddle factor values in the 3 twiddle factor case shown in FIG. 7, the memory address value thereof is determined in a like manner of the 2 twiddle factor case.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the number of memories for storing the twiddle factors is reduced to $$\frac{N}{8} + 1$$

when the Radix-4 FFT processor is realized, an IC chip area may be minimized, and power consumption may be reduced.

In addition, since the address of the twiddle factor is calculated by the suggested equations and algorithm, the control signal may be formed by a simplified switch.

The invention claimed is:

1. A twiddle factor generator for generating a final twiddle factor value for an nth twiddle factor in a fast Fourier transform (FFT) system, the twiddle factor generator comprising:
   a hardware memory address calculator for generating a temporary address value for the nth twiddle factor, generating a twiddle factor memory address value for the nth twiddle factor based on the temporary address value, and outputting a control signal based on the temporary address value;
   a twiddle factor storage unit for storing a twiddle factor value corresponding to the twiddle factor memory address value for the nth twiddle factor, the twiddle factor value generated based on a previously generated twiddle factor value, and outputting the twiddle factor value as a real part and an imaginary part; and
   a controller for outputting the final twiddle factor value to the FFT system based on the control signal output from the memory address calculator and the twiddle factor value output from the twiddle factor storage unit, wherein the memory address calculator generates the temporary address value for the nth twiddle factor by:
calculating a multiplied value by multiplying a sign value of the nth twiddle factor and a parameter value indicating a twiddle factor case; and
adding the multiplied value to a twiddle factor memory address value for an (n-1)th twiddle factor.

2. The twiddle factor generator of claim 1, wherein the controller comprises:
a first switch for switching the real part and the imaginary part of the twiddle factor value based on the control signal and outputting the switched real and imaginary parts;
a sign inverter for inverting signs of the real and imaginary parts of the twiddle factor value output from the twiddle factor storage unit and signs of the switched real and imaginary parts; and
a second switch for performing connection on the sign inverter to invert the signs of the real part and the imaginary part of the twiddle factor value.

3. The twiddle factor generator of claim 1, wherein the twiddle factor case is 0, 1, 2, or 3, and a plurality of twiddle factor memory address values corresponding to the twiddle factor case are sequentially output from the memory address calculator.

4. The twiddle factor generator of claim 3, wherein the control signal is a first control signal or a second control signal based on the temporary address value of the nth twiddle factor and a minimum symmetric point of the (n-1)th twiddle factor.

5. The twiddle factor generator of claim 4, wherein the first control signal is activated when the temporary address value of the nth twiddle factor is equal to or greater than the minimum symmetric point of the (n-1)th twiddle factor, and the second control signal is activated when the temporary address value of the nth twiddle factor is equal to or less than 0.

6. The twiddle factor generator of claim 5, wherein, when the first control signal is activated, the twiddle factor memory address value of the nth twiddle factor is set by subtracting the temporary address value of the nth twiddle factor from the minimum symmetric point of the (n-1)th twiddle factor multiplied by two.

7. The twiddle factor generator of claim 5, wherein, when the second control signal is activated, the twiddle factor memory address value of the nth twiddle factor is set by inverting the sign of the temporary address value of the nth twiddle factor.

8. The twiddle factor generator of claim 5, wherein the real and imaginary parts of the twiddle factor value output from the switch are switched when the first control signal is activated, and a sign of the real part or the imaginary part of the twiddle factor value output from the twiddle factor storage unit is inverted when the second control signal is activated.

9. The twiddle factor generator of claim 1, wherein the twiddle factor storage unit has a dimension obtained by dividing a dimension of the FFT by the minimum symmetric point of the nth twiddle factor and adding 1 thereto.

10. The twiddle factor generator of claim 1, wherein the FFT system performs an FFT operation in a Radix-4 method.

11. A method for generating a twiddle factor memory address value for an nth twiddle factor and a control signal in a fast Fourier transform (FFT) system, the method comprising:
generating a temporary address value of the nth twiddle factor;
generating the control signal for controlling the FFT system based on the temporary address value of the nth twiddle factor; and
outputting, by a hardware memory address calculator, the twiddle factor memory address value for the nth twiddle factor to a twiddle factor storage unit after generating the twiddle factor memory address value based on the temporary address value, and outputting the control signal to a controller,
wherein the generating the temporary address value of the nth twiddle factor comprises:
calculating a multiplied value by multiplying a sign value of the nth twiddle factor and a parameter value indicating a twiddle factor case; and
adding the multiplied value to a twiddle factor memory address value for an (n-1)th twiddle factor,
wherein the twiddle factor storage unit outputs a twiddle factor value corresponding to the twiddle factor memory address value for the nth twiddle factor, the twiddle factor value generated based on a previously generated twiddle factor value, and
wherein the controller outputs a final twiddle factor value to the FFT system based on the control signal output from the memory address calculator and the twiddle factor value output from the twiddle factor storage unit.

12. The method of claim 11, wherein the twiddle factor case is 0, 1, 2, or 3, and a plurality of twiddle factor memory address values corresponding to the twiddle factor case are sequentially output from the memory address calculator.

13. The method of claim 11, wherein, in the generating of the control signal, the control signal is generated as a first control signal when the temporary address value of the nth twiddle factor is equal to or greater than a minimum symmetric point of the (n-1)th twiddle factor, and the control signal is generated as a second control signal when the temporary address value of the nth twiddle factor is equal to or less than 0.

14. The method of claim 13, wherein, the outputting of the twiddle factor memory address value comprises, when the first control signal is generated, setting the twiddle factor memory address value of the nth twiddle factor by subtracting the temporary address value of the nth twiddle factor from the minimum symmetric point of the (n-1)th twiddle factor multiplied by two.

15. The method of claim 13, wherein, the outputting of the twiddle factor memory address value comprises, when the second control signal is generated, setting the twiddle factor memory address value of the nth twiddle factor by inverting a sign of the temporary address value of the nth twiddle factor.

16. The method of claim 13, wherein, in the outputting of the twiddle factor memory address value, when the temporary address value of the nth twiddle factor is less than the minimum symmetric point and greater than 0, the temporary address value of the nth twiddle factor is set as the twiddle factor memory address value of the nth twiddle factor.

17. The method of claim 11, wherein the FFT system performs an FFT operation in a Radix-4 method.

18. A method for generating a final twiddle factor value for an nth twiddle factor in a fast Fourier transform (FFT) system, the method comprising:
generating a temporary address value of the nth twiddle factor;
generating a control signal for controlling the FFT system based on the temporary address value of the nth twiddle factor;
outputting, by a hardware memory address calculator, a twiddle factor memory address value for the nth twiddle factor after generating the twiddle factor memory address value based on the temporary address value, and outputting the control signal;

outputting, from a twiddle factor storage unit, a twiddle factor value corresponding to the twiddle factor memory address value for the nth twiddle factor, the twiddle factor value generated based on a previously generated twiddle factor value; and outputting the final twiddle factor value to the FFT system based on the control signal output from the memory address calculator and the twiddle factor value output from the twiddle factor storage unit, wherein the generating the temporary address value of the nth twiddle factor comprises:
- calculating a multiplied value by multiplying a sign value of the nth twiddle factor and a parameter value indicating a twiddle factor case; and
- adding the multiplied value to a twiddle factor memory address value for an (n-1)th twiddle factor.

* * * * *